US005493902A

United States Patent [19]

Glidewell et al.

[11] Patent Number: 5,493,902

[45] Date of Patent: Feb. 27, 1996

[54] ON-BOARD DETECTION OF PRESSURE REGULATOR MALFUNCTION

[75] Inventors: John M. Glidewell, Dearborn; Granger K. Chui, Dearborn Heights; Woong-Chul Yang, Ann Arbor, all of Mich.

[73] Assignee: Ford Motor Company, Dearborn, Mich.

[21] Appl. No.: 204,130

[22] Filed: Mar. 2, 1994

[51] Int. Cl.$^{6}$ .................................................... G01M 15/00

[52] U.S. Cl. .......................................... 73/119 A; 123/479

[58] Field of Search .......................... 73/119 A; 123/478, 123/479, 480, 483, 484, 485

[56] References Cited

U.S. PATENT DOCUMENTS

| | | | |
|---|---|---|---|
| 4,145,932 | 3/1979 | Pagel | 73/119 A |
| 4,261,209 | 4/1981 | Hatsuno et al. | 73/119 A |
| 4,494,511 | 1/1985 | Ito et al. | 123/478 |
| 4,503,820 | 3/1985 | Nakagawa | 73/119 A |
| 4,756,291 | 7/1988 | Cummins et al. | 123/497 |

*Primary Examiner*—Richard Chilcot
*Assistant Examiner*—Eric S. McCall
*Attorney, Agent, or Firm*—Peter Abolins; Roger L. May

[57] ABSTRACT

The present invention is directed to an on-board diagnostic system for detecting a defective fuel line pressure regulator in an internal combustion engine during engine operation. Pressure sensor means are provided for sensing fuel pressure in the fuel supply line and for generating corresponding pressure signals. Signal processing means receive and process the pressure signals from the pressure sensor means. An output signal is generated by the signal processing means in the event pressure signals are determined to indicate a malfunctioning pressure regulator. Such output signal can be stored, used to alert an engine operator to an impaired regulator and/or provided to a fuel injector control means for adjusting the duration of injector actuation to better achieve a desired fuel flow quantity per individual actuation.

2 Claims, 1 Drawing Sheet

ON-BOARD DETECTION OF PRESSURE REGULATOR MALFUNCTION

INTRODUCTION

The present invention is directed to a diagnostic system for an internal combustion engine to detect a defective fuel line pressure regulator. More specifically, the invention is directed to an on-board diagnostic system for detecting a malfunctioning fuel line pressure regulator during engine operation.

BACKGROUND OF THE INVENTION

It is becoming increasingly desirable to provide on-board diagnostic means for certain components of internal combustion engines, especially components which impact on critical engine performance criteria. This is particularly true in the motor vehicle industry, where high precision in the control of fuel supply to the engine has become essential to various present and planned engine management features designed to meet emissions, performance, drivability, and maintenance objectives. It is now well known how to adjust the fuel flow to the cylinders of an engine to maintain desired fuel/air mixture ratio for meeting engine emission requirements by electronically controlling the actuation timing and duration of the engine's fuel injectors. Electronic fuel injector control may be incorporated into known electronic engine control (EEC) modules performing a variety of engine control functions. In accordance with such known systems, the timing of injector actuation is controlled by the timing of the corresponding actuation signal sent by the control module. The duration of injector actuation, during which fuel is passed through the injector from a fuel rail or like fuel supply means, is controlled by the duration of the actuation signal from the control module, that is, by the pulse width of the signal.

Reliably controlling fuel supply to an engine by controlling fuel injector actuation signal timing and duration (i.e., pulse width) assumes the absence of various possible fuel system problems, such as unstable pressure in the fuel supply line. Thus, especially in support of maintaining the efficacy of electronic engine management devices adapted to control air/fuel ratio by controlling the actuation of fuel injectors, it would be desirable to provide an on-board diagnostic system to periodically test for pressure regulator malfunction during engine operation. It is a primary object of the present invention to provide such on-board diagnostic system. Additional objects and features of various embodiments of the invention will be apparent from the following disclosure.

SUMMARY OF THE INVENTION

The on-board diagnostic system of the present invention employs analysis of fuel supply line pressure during ongoing operation of an internal combustion engine. A malfunctioning pressure regulator will produce unstable fuel supply line pressure, which can adversely affect fuel control by altering the amount of fuel delivered by a fuel injector during a given actuation period. The pressure regulator itself may be defective or it may malfunction due to a blocked or leaking vacuum line, etc. It has been found that analysis of fuel line pressure signals generated by a pressure transducer mounted to a fuel supply line of the engine can accurately detect or diagnose malfunction of the fuel line pressure regulator. In accordance with one aspect, an internal combustion engine is provided with an on-board diagnostic system comprising fuel supply means for supplying liquid fuel under pressure to the combustion cylinders of the engine, including generally a plurality of fuel injectors operatively connected to a fuel rail. Fuel injector control means are provided for individually actuating the fuel injectors to pass fuel from the fuel rail during a controlled actuation period. Pressure sensor means senses fuel line pressure, including transient fuel pressure waves in the fuel line, e.g., those resulting from actuation of the fuel injectors, and generates a corresponding pressure signal which varies with the pressure sensed. The pressure sensor means may employ a pressure transducer comprising, for example, a pressure responsive diaphragm exposed to fuel in the fuel line and a signal conditioner to generate a continuous analog voltage output signal. Fuel line pressure and its variance including, for example, measurable fuel line pressure transients and/or unstable average fuel line pressure, have a good degree of correspondence to fuel line pressure regulator malfunction. In fact, the present invention represents a significant advance in electronic on-board engine diagnosis in part for its use of such correspondence to pressure regulator malfunction, i.e., for its presently disclosed means and method of detecting such malfunction during engine operation using fuel pressure waves.

Signal processing means are provided for processing the pressure signals from the pressure sensor means to detect pressure regulator malfunction, and for generating an output signal in response thereto. The on-board diagnostic system further comprises utilization means operatively connected to the signal processing means for receiving the output signal and manifesting its presence, e.g., by storing an indicator code accessible to a service technician, by illuminating an indicator lamp, etc.

As noted above, pressure regulator malfunction can degrade the control of exhaust emissions, engine performance, etc. Hence, the detection of such malfunction by the on-board diagnostic system of this invention, which acts during on-going operation of the engine, can help control exhaust emissions and engine performance, and can be employed in an adaptive strategy to manage fuel flow in the engine. It should be understood that reference herein to pressure signal processing during ongoing engine operation is intended to mean not only routine on-road operation, but also test operation, e.g., immediately following initial engine or vehicle assembly. Thus, the on-board diagnosis system could be used, optionally, while the engine is running without fuel ignition. In fact, a test liquid in place of gasoline or other fuel could be used, such as stoddard solvent which, like liquid fuel, gives a predictable fuel line pressure wave signal as the engine is cycled. It is one advantage of this invention that the signal processing called for need not be performed in real time. This is especially significant in those embodiments wherein the signal processing means is incorporated into an electronic engine control module performing various other computation and control functions. The signal processing for diagnosing pressure regulator malfunction can be performed at different times as EEC capacity is available. These and other features and advantages of the present invention will be better understood in view of the following detailed description of certain preferred embodiments.

BRIEF DESCRIPTION OF THE DRAWINGS

Certain preferred embodiments are described below with reference to the appended drawing, in which.

DETAILED DESCRIPTION OF CERTAIN PREFERRED EMBODIMENTS

Figure 1:
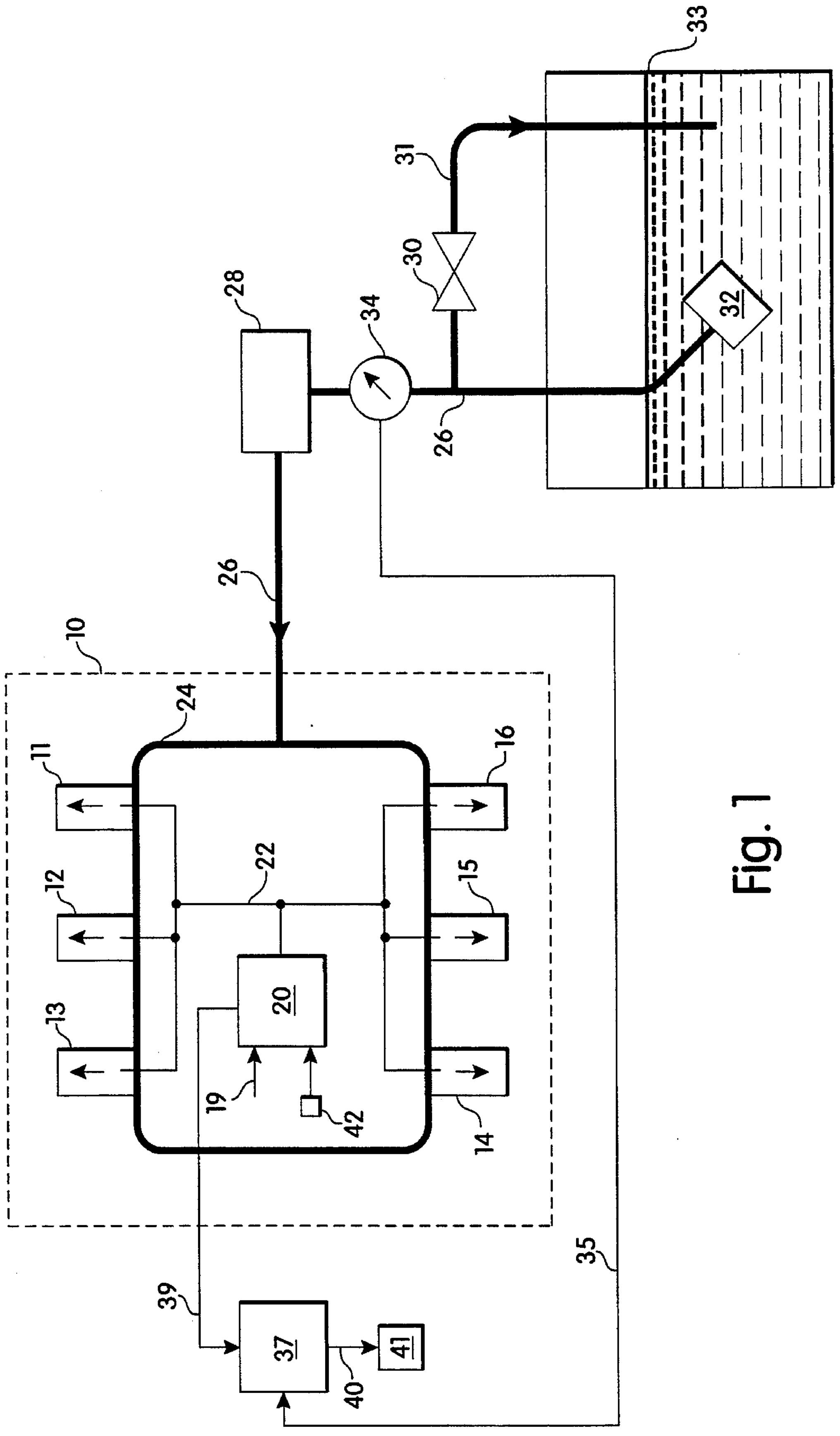
FIG. 1 is a schematic illustration of an internal combustion engine fuel system comprising an on-board diagnostic system for detecting fuel pressure regulator malfunction during engine operation in accordance with a first embodiment of the invention.

The present invention addresses the aforesaid diagnostic need by providing an on-board diagnostic system for detecting fuel line pressure regulator malfunction. Such malfunction can occur through normal engine use. While the present invention is applicable generally to any internal combustion engine burning liquid fuel supplied to fuel injectors via a fuel rail, it is especially advantageous for multi-cylinder motor vehicle engines. Accordingly, without intending to limit the scope of the invention, the discussion below will focus primarily on four stroke multi-cylinder motor vehicle engines. In that regard, reference in this discussion to an engine cycle or to a complete engine cycle (of a four stroke engine) is intended to mean two full revolutions of the engine. In a four stroke engine, each cylinder fires once during two full revolutions. Thus, in one complete engine cycle each cylinder fires once.

A properly running engine having a diagnostic system as herein disclosed will have a characteristic fuel line pressure wave pattern for a given segment of an engine cycle, at a given point along the fuel line, under given engine operating conditions. Typically, pressure regulator malfunction results in fuel line pressure irregularity. The aforesaid signal processing means analyzes the pressure signals from the aforesaid pressure sensor over a selected test interval of certain duration or spanning one or more complete engine cycles, to obtain a characteristic value, preferably corresponding to average fuel pressure over the test interval period, to be compared to a corresponding stored value. Specifically, the signal processing means compares the test interval value to a stored value corresponding to proper pressure regulator functioning. The stored values may be stored, for example, in ROM memory of an EEC module. Upon detecting a difference between the two values, the signal processing means generates an output signal. Optionally, it may also generate a different output signal if no malfunction is detected.

In certain preferred versions or embodiments, the signal processing means comprises a wave form analyzer, most preferably a Fast Fourier Transform analyzer. Such signal processing means, which are commercially available and known to those skilled in the art, may be used to analyze a certain preselected frequency range of the pressure signals, preferably a frequency range of about 50 to 1000 Hz, more preferably 50 to 200 Hz. Fast Fourier Transform analysis of pressure signals within such frequency range over a test interval, as described above, preferably yields a value of certain magnitude corresponding to amplitude for one or more frequencies or frequency sub-ranges (both frequencies and frequency sub-ranges being referred to herein simply as frequencies). Within the constraints of available signal processing speed and capacity, greater diagnostic accuracy and reliability will be obtained by diagnosis based on determination of a larger number of samples of pressure signal value over the test interval. The signal processing means then compares the magnitude value to its corresponding stored value. The aforesaid output signal is generated by the signal processing means when the difference between at least one magnitude value and its corresponding stored value exceeds a preselected amount. Any such difference would indicate a pressure irregularity in the fuel supply line which the pressure regulator is unable to correct or suppress. In preferred embodiments, the magnitude value corresponds to average actual fuel line pressure and the stored value corresponds to proper average fuel line pressure. The difference between the two values indicates the amount by which average fuel line pressure differs from the proper average pressure. Thus, a difference greater than zero or other preselected amount can be set as the threshold above which the output signal is generated.

The magnitude value will be generally predictable with sufficient accuracy for a preselected test interval during operation of a known engine configuration having a diagnostic system in accordance with this invention, the predicted value being used, with or without adjustment as discussed below, as the aforesaid stored value corresponding to proper functioning of the pressure regulator.

The stored value, preferably corresponding to average pressure in the fuel supply line, as stated above, may be a calculated or empirically determined value for the correct average pressure. Alternatively, it may be based on the average pressure in the fuel supply line at the pressure transducer over a time period prior to the test interval, for example, over a previous test interval. Thus, the stored value may be periodically updated by the signal processing means. Such stored value may in that case be stored in RAM memory accessible to the signal processing means. The signal processor would, in such embodiments, analyze pressure signals from the pressure sensor means to determine an average pressure in the fuel supply line over the test interval in question. Signal processing means would in that case generate the aforesaid output signal if, upon comparing the test interval value to the stored value, a difference was found indicative of an unacceptably large change in fuel line average pressure.

Optionally, to enhance the accuracy or reliability of the diagnostic system, the average pressure or other value developed by the signal processor for a given test interval can be combined, for example, by averaging, with that of one or more additional such test intervals. Each test interval preferably would extend over one or more complete engine cycles or over a comparable preselected time period. In this way, there is a reduced likelihood of a false indication of pressure regulator function due to aberrant fuel pressure transients during a test interval. Similarly, the output signal may be generated only when two or more test intervals in a pre-selected number of consecutive test intervals each independently indicates pressure regulator malfunction. Thus, for example, the output signal may be generated by the signal processor only when at least three of the last five, or ten of the last fifteen or twenty test intervals indicates pressure regulator malfunction. Preferably, the individual test interval results are stored in RAM memory, with the result for each new test interval replacing the oldest stored result (that is, first-in-first-out).

Those skilled in the art will recognize the potential advantages using the pressure regulator diagnostic system of this invention together with means for monitoring the functioning of other components, such as the fuel pump, etc., to isolate the cause of fuel line pressure irregularity. In particular, since nominal fuel line pressure typically is related to the level of air intake manifold vacuum, the signal processor preferably receives an input signal from a MAP sensor or the like. Alternatively (or in addition), the test interval can be run while the engine is at open or other preselected, fixed throttle position, preselected RPM, etc.

The output signal can actuate a warning to the operator (e.g., the driver of a vehicle) that the pressure regulator should be serviced or checked for malfunction. Alternatively (or in addition) the output signal can be used to cause an adjustment of the fuel control signals generated by the EEC module. It could serve as an input signal to the engine's EEC module for adaptive air/fuel ratio control, that is, to enable the EEC computer to adjust injector actuation duration and/or timing to compensate for altered flow rate through the injectors resulting from pressure regulator malfunction. For example, an output signal based on determination of low average pressure could be used to adjust the fuel injector actuation signal pulse width to lengthen fuel injector actuation duration. Reduced fuel flow through the injectors due to low fuel line pressure could thereby be offset by an increase in actuation duration. Similarly, an output signal based on high average pressure could be used to correspondingly shorten actuation duration. The output signal of the diagnostic system also may be stored for subsequent access by a service technician and/or used to cause an audible or visible warning for the vehicle operator.

Pressure sensor means provided for sensing fuel pressure in the fuel line preferably generates a variable voltage signal corresponding to pressure sensed. The pressure sensor means may employ a pressure transducer comprising, for example, a pressure responsive diaphragm exposed to the fuel in the fuel line and a signal conditioner to generate a continuous analog voltage output pressure signal. The pressure signal from the pressure sensor means will vary over time in response to changing fuel pressure in the fuel line.

Initiation of the test interval preferably is timed to start at a preselected point in the engine cycle. This is especially significant if the test interval for which the signal processing means analyzes pressure signals from the pressure sensor is other than one or more whole engine cycles. To synchronize acquisition of pressure waveforms, analyzer triggering (i.e., the point where time=0 for each plotted waveform) preferably is set to a known point in the engine cycle, for example, to a fixed current shunt voltage (e. g., +80 mv) of a selected injector at the injector controller.

A preferred embodiment of the invention is illustrated in FIG. 1, wherein a six cylinder engine 10 is seen to comprise a fuel supply system for supplying gasoline under pressure to the combustion cylinders of the engine. The fuel supply system consists of high pressure electric Gerotor-type pump 32 delivering fuel from a storage tank 33 through an inline fuel filter 28 to a fuel charging manifold assembly 24 via solid and flexible fuel lines. The fuel charging manifold assembly, referred to as a fuel rail, supplies fuel to electronically actuated fuel injectors 11–16. Air entering the engine is measured by a mass airflow meter. Air flow information, exhaust gas sensor signals and input from other engine sensors, collectively shown as input 19, is used by an onboard engine electronic control computer 20 to calculate the required fuel flow rate necessary to maintain a prescribed air/fuel ratio for a given engine operation. The injectors, when energized, spray a predetermined quantity of fuel in accordance with engine demand. The duration of the actuation period during which the injectors are energized, determined by the actuation signal pulse width, is controlled by the vehicle's EEC computer 20. Thus, the EEC computer serves as the fuel injector control means, and, typically, performs various additional engine control functions.

The fuel injector is an electromechanical device that atomizes the fuel delivered to the engine. Injectors typically are positioned so that their tips direct fuel at the engine intake valves. The valve body consists of a solenoid actuated pintle or needle valve assembly that sits on a fixed size orifice. A constant pressure drop is maintained across the injector nozzles via pressure regulator 30. An electrical signal from the EEC unit activates the solenoid, causing the pintle to move inward, off the seat, allowing fuel to flow through the orifice.

In the embodiment of FIG. 1, fuel injector control means 20 has injector signal output means 22 connected to the injector drivers of the fuel injectors 11–16. Injector signals from fuel injector control means 20 control the sequence and timing of fuel injector actuation, including the duration of the actuation period during which each fuel injector, in turn, is open to pass fuel from fuel rail 24 to the respective combustion chamber. Pressure regulator 30 is located proximate to fuel pump 32. That is, it is closer to fuel pump 32 than to the fuel rail 24 and is upstream of the fuel filter 28. Pressure sensor means 34 is mounted on fuel supply line 26 upstream of the fuel filter 28 and downstream of the point at which shunt line 31 meets main supply line 26. Suitable regulators are commercially available and will be apparent to those skilled in the art in view of the present disclosure. The fuel pressure regulator typically is a diaphragm operated relief valve with one side of the diaphragm sensing fuel pressure and the other side subjected to intake manifold pressure. The nominal fuel pressure is established by a spring pre-load applied to the diaphragm. Referencing one side of the diaphragm to manifold pressure aids in maintaining a constant pressure drop across the injectors. Fuel in excess of that used by the engine passes through the regulator and returns to the fuel tank 33 via shunt line 31.

Suitable pressure sensor means are commercially available and include, for example, variable reluctance, differential pressure transducers. Preferably the transducer has good transient response to low frequency transient pressure waves, low frequency here meaning 1 KHz or lower. The pressure sensor means preferably also has a high output signal with low susceptibility to electrical noise and good durability to withstand vibrations and shock experienced in a motor vehicle engine environment. Employing pressure sensor means having a transducer diaphragm vented on one side to atmosphere allows gage measurement of pressure (PSIG). The output signal from the pressure transducer preferably is a continuous analog voltage out signal, where signal voltage varies directly with fuel pressure. Zero voltage can be set to the nominal fuel pressure established for the fuel line. The pressure sensor means 34 may further comprise signal conditioning means. Thus, the pressure transducer may be connected by a shielded cable to a signal conditioner. Suitable signal conditioners are commercially available and will be apparent to those skilled in the art in view of the present disclosure. In accordance with such preferred embodiments, the signal conditioner sources the pressure transducer with excitation power and amplifies the transducer output. The resulting pressure signal, that is, analog voltage output 35 of the pressure sensor means 34 is, therefore, proportional to fuel line pressure sensed by the pressure transducer.

The pressure signal is input to signal processing means 37 for generating an output signal in response thereto. Signal processing means 37 can be, for example, a programmable waveform analyzer, various models of which are commercially available and will be readily apparent to those skilled in the art in view of this disclosure. Such analyzers digitize and store analog voltage signals, typically at a rate of about 100 kilosamples per second. The pressure signal from the pressure transducer is processed by signal processing means preferably comprising a stand along chip set to perform Fast Fourier Transform (FFT) analysis of the pressure signal, or comparable functionality in an EEC module. Commercially available chip sets perform-FFT analysis of waveforms as a series of digital values over time. The signal processing means preferably is responsive to a timing signal 39 from the fuel injector control means 20 to synchronize acquisition of pressure waveforms with the actuation of an individual injector or the like.

The signal processing means 37 preferably takes multiple values of the pressure signal 35 over an actuation sampling period initiated after receipt of the timing signal 39 from the fuel injector control means 20. Typically, the signal processing means will employ a test interval equal in length to a single full engine cycle, with signal value acquisitions every 100 to 500 microseconds (μs). Thus, at an engine operating speed of 1000 RPM, for a six cylinder engine, the test interval would be 120 ms, with 240 to 1200 pressure signal value acquisitions to be processed. Those who are skilled in this technology will recognize that frequent sampling yields more accurate or reliable results when processed, e.g., to produce a frequency spectrum by Fast Fourier Transform analysis as discussed above.

Output signal 40 from signal processing means 37 is received by utilization means 41. As discussed above, utilization means 41 may comprise, for example, an indicator light and/or signal storage means. Utilization means 41 may comprise functionality within fuel injector control means 20.

Those skilled in the art will recognize that the subject matter disclosed herein can be modified and/or implemented in alternative embodiments without departing from the true scope and spirit of the present invention as defined by the following claims.

We claim:

1. An internal combustion engine having an on-board diagnostic system for detecting a malfunctioning fuel line pressure regulator during engine operation, comprising:

fuel supply means for supply liquid fuel under pressure to combustion cylinders of the engine, comprising the fuel line pressure regulator operatively connected to a fuel supply line;

pressure sensor means for generating pressure signals corresponding to transient fuel pressure waves in the fuel rail, comprising a pressure transducer mounted to the fuel supply line with a pressure responsive diaphragm exposed to fuel in the fuel supply line and a signal conditioner to generate the pressure signal as a continuous analog voltage output signal varying with pressure sensed in the fuel supply line;

signal processing means comprising a waveform analyzer having means for Fast Fourier Transform analysis of the pressure signals, operatively connected to the pressure means for receiving and processing pressure signals from the pressure sensor means in a frequency range of 50 to 1,000 Hz, and for generating an output signal in response to pressure signals corresponding to transient fuel pressure waves indicative of malfunction of the pressure regulator; and utilization means operatively connected to the signal processing means for receiving the output signal and manifesting its presence.

2. The internal combustion engine of claim 1 wherein the signal processing means is for determining a magnitude value of the pressure signals over a first time period during engine operation and for comparing the magnitude value to a stored value, and wherein the output signal is generated when the difference between the magnitude value and the stored value exceeds a preselected amount.

* * * * *